United States Patent
Anderson et al.

(10) Patent No.: US 11,585,274 B2
(45) Date of Patent: Feb. 21, 2023

(54) TURBINE REAR FRAME LINK ASSEMBLIES FOR TURBOFAN ENGINES

(71) Applicant: General Electric Company, Schenectady, NY (US)

(72) Inventors: William C. Anderson, Evendale, OH (US); Thomas E. Agin, Evendale, OH (US); Michael William Murrish, Evendale, OH (US); Timothy McCann, Cincinnati, OH (US); Caitlin Ford, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/135,640

(22) Filed: Dec. 28, 2020

(65) Prior Publication Data
US 2022/0205391 A1 Jun. 30, 2022

(51) Int. Cl.
*F02C 7/20* (2006.01)
*F01D 25/28* (2006.01)

(52) U.S. Cl.
CPC ............... *F02C 7/20* (2013.01); *F01D 25/28* (2013.01); *F05D 2220/32* (2013.01)

(58) Field of Classification Search
CPC ............ F01D 25/28; F01D 25/26; F02C 7/20
See application file for complete search history.

(56) References Cited

U.S. PATENT DOCUMENTS

| | | | | |
|---|---|---|---|---|
| 8,100,634 B2* | 1/2012 | Evans | ............ | F01D 9/042 415/115 |
| 8,272,203 B2* | 9/2012 | Derenes | ............ | F02K 3/06 60/797 |
| 8,444,084 B2* | 5/2013 | Udall | ............ | B64D 27/26 244/54 |
| 8,844,861 B2* | 9/2014 | Balk | ............ | B64D 27/26 244/54 |
| 9,695,854 B2* | 7/2017 | Gutta | ............ | F16B 7/06 |
| 9,803,502 B2* | 10/2017 | Cherolis | ............ | F01D 9/065 |

(Continued)

FOREIGN PATENT DOCUMENTS

| | | |
|---|---|---|
| EP | 1541468 | 11/2004 |
| EP | 1847457 | 10/2007 |
| EP | 1902951 A1 | 3/2008 |

(Continued)

*Primary Examiner* — Igor Kershteyn
*Assistant Examiner* — John S Hunter, Jr.
(74) *Attorney, Agent, or Firm* — Hanley, Flight & Zimmerman, LLC

(57) ABSTRACT

A turbofan engine includes an outer bypass duct and a gas turbine engine having an outer casing. The gas turbine engine is disposed in the outer bypass duct such that a bypass airflow passage is formed between the outer casing of the gas turbine engine and the outer bypass duct. The turbofan engine includes a turbine rear frame link assembly including a set of links coupled between the outer bypass duct and the outer casing to support the gas turbine engine relative to the outer bypass duct. The links are arranged around the gas turbine engine on a plane that is perpendicular to a centerline axis of the turbofan engine. None of the links extends through the bypass airflow passage at a position that intersects a radius extending in a vertically downward direction from the centerline axis.

19 Claims, 8 Drawing Sheets

(56) References Cited

U.S. PATENT DOCUMENTS 9,828,105 B2    11/2017  Cloft
9,828,877 B2 *  11/2017  Riviere ..................... F02C 7/20

FOREIGN PATENT DOCUMENTS

| EP | 2251540    | 11/2010 |
|----|------------|---------|
| EP | 2562086    | 2/2013  |
| FR | 2928181 A1 | 9/2009  |
| GB | 2434836    | 8/2007  |
| WO | 2010007226 | 1/2010  |

* cited by examiner

TURBINE REAR FRAME LINK ASSEMBLIES FOR TURBOFAN ENGINES

FEDERALLY SPONSORED RESEARCH STATEMENT

This invention was made with United States Government support. The Government has certain rights in the invention.

FIELD OF THE DISCLOSURE

The present disclosure relates generally to turbofan engines and, more particularly, to turbine rear frame link assemblies for turbofan engines.

BACKGROUND

Turbofan engines, such as those used on aircraft, generally include a fan, a gas turbine engine to drive the fan, and an outer bypass duct. The fan and the gas turbine engine are disposed within the outer bypass duct such that a bypass airflow passage is formed between the gas turbine engine and the outer bypass duct. The fan produces accelerated airflow, a portion of which flows through the bypass airflow passage and used to produce forward thrust. The gas turbine engine is typically supported in the outer bypass duct by one or more structural members.

BRIEF DESCRIPTION

Aspects and advantages of the invention will be set forth in part in the following description, or may be obvious from the description, or may be learned through practice of the invention.

In one aspect, the present disclosure is directed to a turbofan engine that includes an outer bypass duct and a gas turbine engine having an outer casing. The gas turbine engine is disposed in the outer bypass duct such that a bypass airflow passage is formed between the outer casing of the gas turbine engine and the outer bypass duct. The turbofan engine also includes a turbine rear frame link assembly including a set of links coupled between the outer bypass duct and the outer casing to support the gas turbine engine relative to the outer bypass duct. The links are arranged around the gas turbine engine on a plane that is perpendicular to a centerline axis of the turbofan engine. None of the links extends through the bypass airflow passage at a position that intersects a radius extending in a vertically downward direction from the centerline axis.

Another aspect of the present disclosure is directed to a turbofan engine that includes an outer bypass duct and a gas turbine engine having an outer casing, an inner casing, and a set of struts coupled between the outer casing and the inner casing. The gas turbine engine is disposed in the outer bypass duct such that a bypass channel is formed between the outer casing of the gas turbine engine and the outer bypass duct. The turbofan engine also includes a turbine rear frame link assembly including a set of links coupled between the outer bypass duct and the outer casing to support the gas turbine engine relative to the outer bypass duct. The links are coupled to the outer casing at circumferential locations corresponding to locations of connections between respective ones of the struts and the outer casing.

Another aspect of the present disclosure is directed to a turbofan engine that includes an outer bypass duct and a gas turbine engine having an outer casing. The gas turbine engine is disposed in the outer bypass duct such that a bypass airflow passage is formed between the outer casing of the gas turbine engine and the outer bypass duct. The turbofan engine also includes a turbine rear frame link assembly including six links coupled between the outer bypass duct and the outer casing to support the gas turbine engine relative to the outer bypass duct. The links are arranged around the gas turbine engine on a plane that is perpendicular to a centerline axis of the turbofan engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
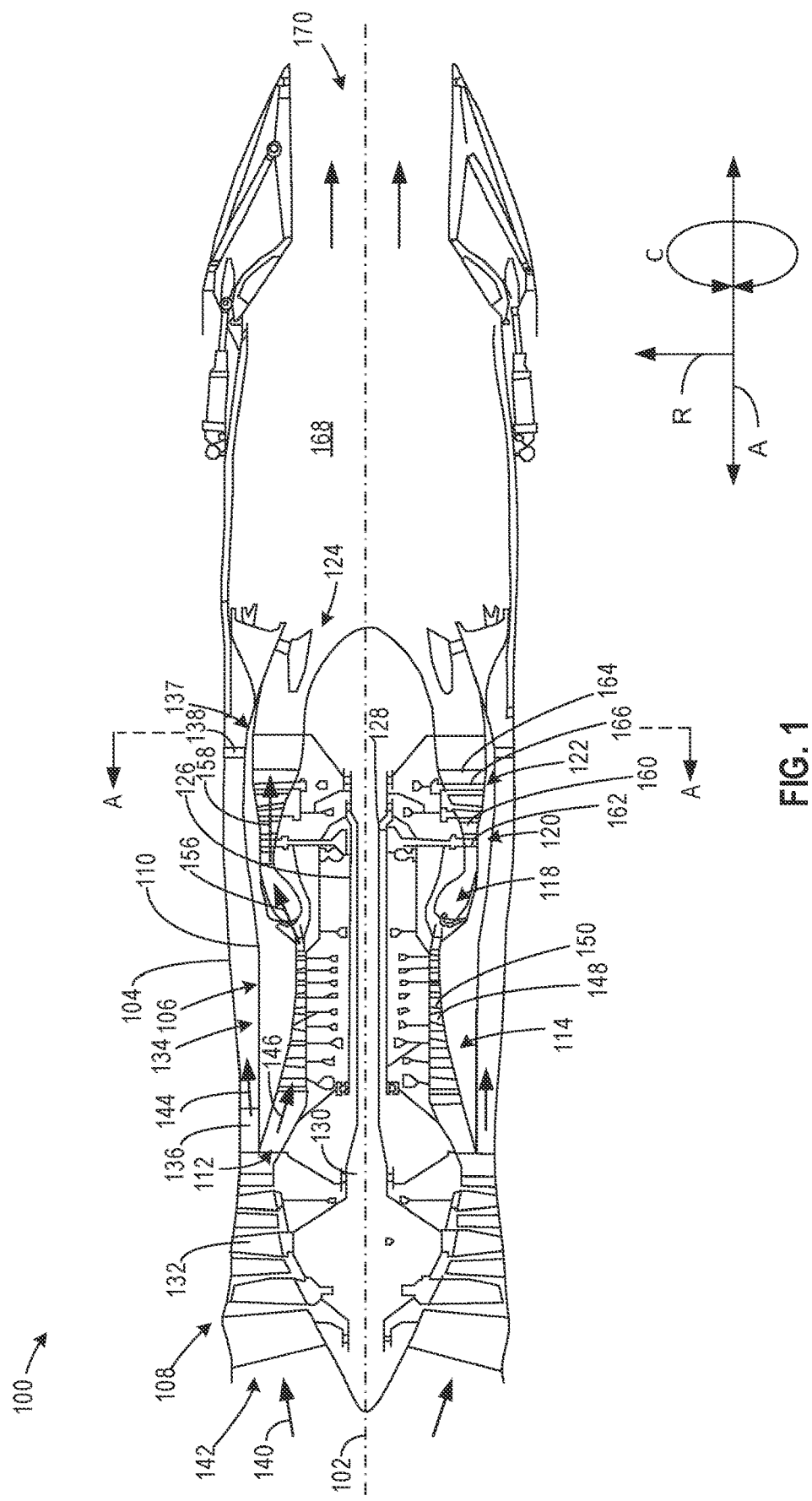
FIG. 1 is a schematic cross-sectional view of an exemplary low-bypass turbofan-type gas turbine engine in accordance with the embodiments disclosed herein.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Disclosed herein are example turbine rear frame link assemblies for turbofan engines, such as low-bypass turbofan engines. The turbofan engines disclosed herein can be used for propulsion on aircraft or other vehicles. A turbine rear frame link assembly ("link assembly") includes a set of links to support a gas turbine engine in a nacelle or outer bypass duct of the turbofan engine. In particular, the links are coupled between the outer bypass duct and an outer casing on a turbine rear frame of the gas turbine engine.

A first exemplary link assembly disclosed herein includes only six links instead of eight, twelve, or fourteen links as commonly used in known turbofan engines. Each of the links in the six link configuration is oriented about 20° (e.g., ±5°) from tangential direction relative to the outer casing of the gas turbine engine. The six link configuration has similar dynamic loading and clearances as known eight link configurations, but, because of the reduced link number, the six link configuration results in less airflow blockage in the bypass airflow passage compared to the known eight, twelve, or fourteen link configurations. As a result, the six link configuration can improve airflow in the bypass airflow channel and, thus, increase (e.g., maximize) aircraft flight range. The six link configuration also reduces (e.g., minimizes) weight, assembly time, and costs associated with manufacture of the turbofan engine.

The links of the six link configuration disclosed herein are arranged such that none of the links extends through a position that is in the vertically downward direction (sometimes referred to as the six o'clock position) relative to a horizontal centerline axis of the turbofan engine. This enables certain lines, such as scavenge and oil drain lines, to extend vertically downward through the duct and exit straight out of the engine. This vertically downward position is most effective for the scavenge and oil drain lines because it allows oil and other fluids to drain directly downward from the gas turbine engine.

The six link configuration disclosed herein also allows for favorable pyrometer probe and turbine button probe (e.g., the T5 position) penetration. In particular, there are limited locations where the pyrometer and turbine button probes can be placed as they are line replaceable units, and have space limitations within the engine bay for installation and extraction with the engine installed in the aircraft.

The six link configuration disclosed herein also enhances strength and reduces weight. In particular, the links are arranged such that each of the links is coupled to the outer casing of the gas turbine engine over a top of a strut. This eliminates the need for bridging material between the top of the strut and the location of link attachment, thereby reducing (e.g., minimizing) weight. Further, positioning the link over the top of the strut increases (e.g., maximizes) stiffening efficiency compared to other configurations that require bridging material.

Also disclosed herein is a second exemplary link assembly that includes eight links. The links are similarly arranged over the tops of the struts on the outer casing and, thus, benefit from the same advantages disclosed above. The links of the eight link configuration are also arranged such that none of the links extends through the position that is in the vertically downward direction relative to the horizontal centerline axis of the turbofan engine. Thus, the eight link configuration achieves the same benefits as the six link configuration disclosed above.

Referring now to the drawings, wherein identical numerals indicate the same elements throughout the figures, FIG. 1 is a schematic cross-sectional view of an exemplary low-bypass turbofan-type gas turbine engine 100 ("turbofan engine 100") as may incorporate various embodiments disclosed herein. While the illustrated example is a low-bypass turbofan engine, the principles of the present invention are also applicable to other types of engines, such as high-bypass turbofans, turbojets, turboprops, etc. As shown in FIG. 1, the turbofan engine 100 defines a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outwardly from the centerline axis 102, and the circumferential direction C is a direction that extends concentrically around the centerline axis 102.

As shown in FIG. 1, the turbofan engine 100 includes an outer bypass duct 104 (which may also be referred to as a nacelle, fan duct, or outer casing), a gas turbine engine 106 (which may also be referred to as a core turbine engine), and a fan section 108. The gas turbine engine 106 and the fan section 108 are disposed at least partially in the outer bypass duct 104. The gas turbine engine 106 is disposed downstream from the fan section 108 and drives the fan section 108 to produce forward thrust.

The gas turbine engine 106 includes a substantially tubular outer casing 110 (which may also be referred to as a mid-casing) that defines an annular inlet 112. The outer casing 110 of the gas turbine engine 106 can be formed from a single casing or multiple casings. The outer casing 110 encloses, in serial flow relationship, a compressor section having a compressor 114 (sometimes considered a high-pressure compressor), a combustion section 118, a turbine section having a high pressure turbine 120 ("HP turbine 120") and a low pressure turbine 122 ("LP turbine 122"), and an exhaust section 124. A high pressure shaft or spool 126 ("HP shaft 126") drivingly couples the HP turbine 120 and the compressor 114. A low pressure shaft or spool 128 ("LP shaft 128") drivingly couples the LP turbine 122 and the fan section 108. The LP shaft 128 can also couple to a fan spool or shaft 130 of the fan section 108. In some examples, the LP shaft 128 can couple directly to the fan shaft 130 (e.g., a direct-drive configuration). In alternative configurations, the LP shaft 128 may couple to the fan shaft 130 via a reduction gear (e.g., an indirect-drive or geared-drive configuration).

As shown in FIG. 1, the fan section 108 includes a plurality of fan blades 132 coupled to and extending radially outwardly from the fan shaft 130. The outer bypass duct 104 circumferentially encloses the fan section 108 and/or at least a portion of the gas turbine engine 106. In particular, the gas turbine engine is disposed in the outer bypass duct 104 such that a bypass airflow passage or duct 134 is formed between the outer casing 110 of the gas turbine engine 106 and the outer bypass duct 104. A forward or upstream section of the gas turbine engine 106 can be supported relative to the outer bypass duct 104 by a plurality of circumferentially-spaced apart outlet guide vanes 136. Furthermore, a downstream section of the gas turbine engine 106, referred to as a turbine rear frame 137, is supported relative to the outer bypass duct 104 by a turbine rear frame link assembly 138, examples of which are disclosed in further detail herein. The turbine rear frame 137 is aft of the turbine sections of the gas turbine engine 106. In some examples, the turbine rear frame 137 is a separate component that is coupled (e.g., bolted) to upstream and/or downstream portions of the gas turbine engine 106. In other configurations, the turbine rear frame 137 can be formed integrally with the upstream and/or downstream portions of the gas turbine engine 106.

As illustrated in FIG. 1, during operation of the turbofan engine 100, air 140 enters an inlet portion 142 of the turbofan engine 100. The air 140 is accelerated by the fan blades 132 (sometimes considered a low-pressure compressor). A first portion 144 of the air 140 flows into the bypass airflow passage 134, while a second portion 146 of the air 140 flows into the inlet 112 of the gas turbine engine 106 (and, thus, into the compressor 114). One or more sequential stages of compressor stator vanes 148 and compressor rotor blades 150 coupled to the LP shaft 128 progressively compress the second portion 146 of the air 140 flowing through the compressor 114. This provides compressed air 156 to the combustion section 118 where it mixes with fuel and burns to provide combustion gases 158.

The combustion gases 158 flow through the HP turbine 120 where one or more sequential stages of HP turbine stator vanes 160 and HP turbine rotor blades 162 coupled to the HP shaft 126 extract a first portion of kinetic and/or thermal energy therefrom. This energy extraction supports operation of the compressor 114. The combustion gases 158 then flow through the LP turbine 122 where one or more sequential stages of LP turbine stator vanes 164 and LP turbine rotor blades 166 coupled to the LP shaft 128 extract a second portion of thermal and/or kinetic energy therefrom. This energy extraction causes the LP shaft 128 to rotate, thereby supporting operation and/or rotation of the fan shaft 130. The combustion gases 158 then exit the gas turbine engine 106 through the exhaust section 124 thereof. The combustion gases 158 mix with the first portion 144 of the air 140 from the bypass airflow passage 134 in an augmentor 168 that is enclosed by the outer bypass duct 104. The combined gases exit an exhaust nozzle 170 (e.g., a converging/diverging nozzle) of the outer bypass duct 104 to produce propulsive thrust.

Figure 2:
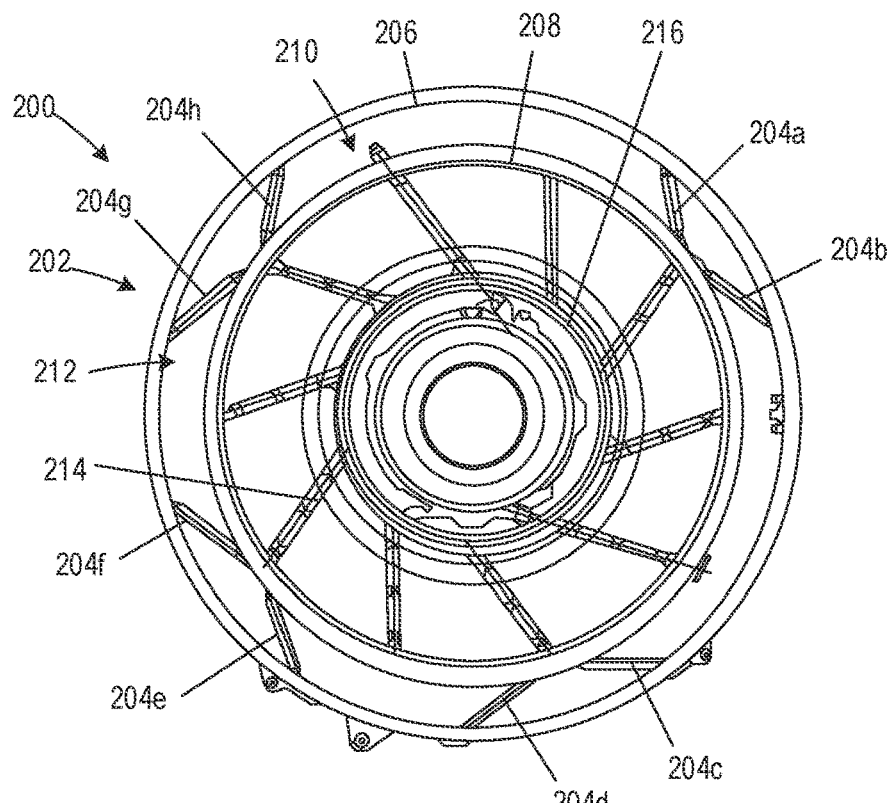
FIG. 2 is an axial view of a turbofan engine having a known turbine rear frame link assembly with eight links.

FIG. 2 is an axial view of a turbofan engine 200 showing a known turbine rear frame link assembly 202. The turbine rear frame link assembly 202 includes eight links 204a-204h coupled between an outer bypass duct 206 and an outer casing 208 of a gas turbine engine 210 of the turbofan engine 200. The links 204a-204h extend through a bypass airflow passage 212 formed between the outer bypass duct 206 and the outer casing 208. The gas turbine engine 210 includes struts 214 (one of which is referenced in FIG. 2) between the outer casing 208 and an inner casing 216 of the gas turbine engine 210.

In the known link configuration shown in FIG. 2, the fourth link 204d extends through the bypass airflow passage 212 at a position that is vertically downward (sometimes referred to as the 6 o'clock position) relative to a longitudinal or centerline axis of the turbofan engine 200. This prevents or complicates the ability to place scavenge and oil drain lines in this position. Further, as shown in FIG. 2, each pair of the links 204a-204h is coupled to the outer casing 208 near (but not over) one of the struts 214, where the strut is between two of the links. However, the links 204a-204h do not connect to the outer casing 208 at circumferential locations along the outer casing 208 where the struts 214 are connected. As such, this requires the use of bridging material to support the connection between the pair of links 204a-204h, the outer casing 208, and the struts 214.

Figure 3:
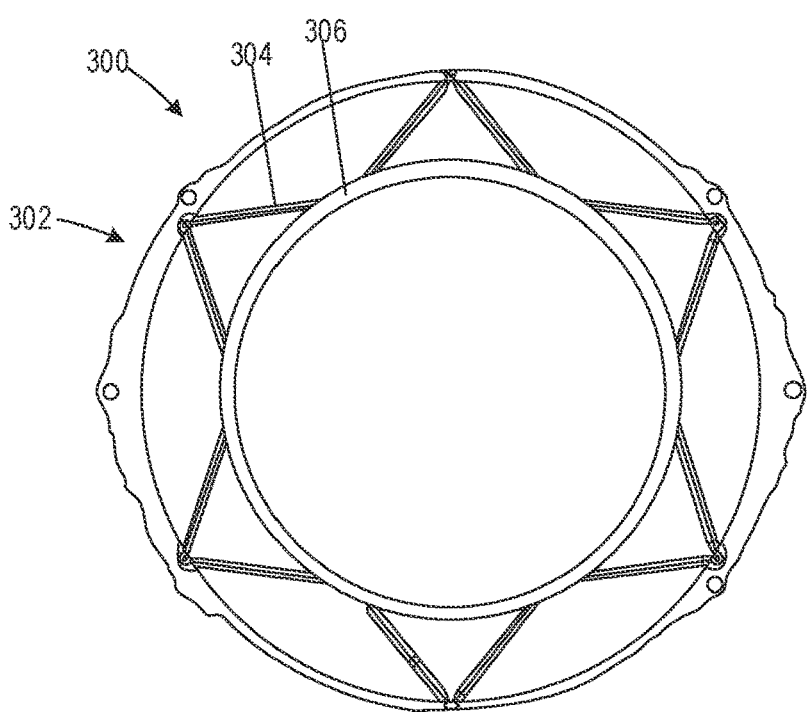
FIG. 3 is an axial view of a turbofan engine having a known turbine rear frame link assembly having twelve links.

FIG. 3 is an axial view of another turbofan engine 300 showing a known turbine rear frame link assembly 302. In this configuration, the link assembly 302 includes twelve links 304 (one of which is referenced in FIG. 3). Like the link configuration in FIG. 2, the link configuration in FIG. 3 also has at least one link at the vertically downward position that prevents or complicates the ability to place scavenge and oil drain lines. Further, bridging material is also used to support the connections between the links 304 and an outer casing 306.

Figure 4:
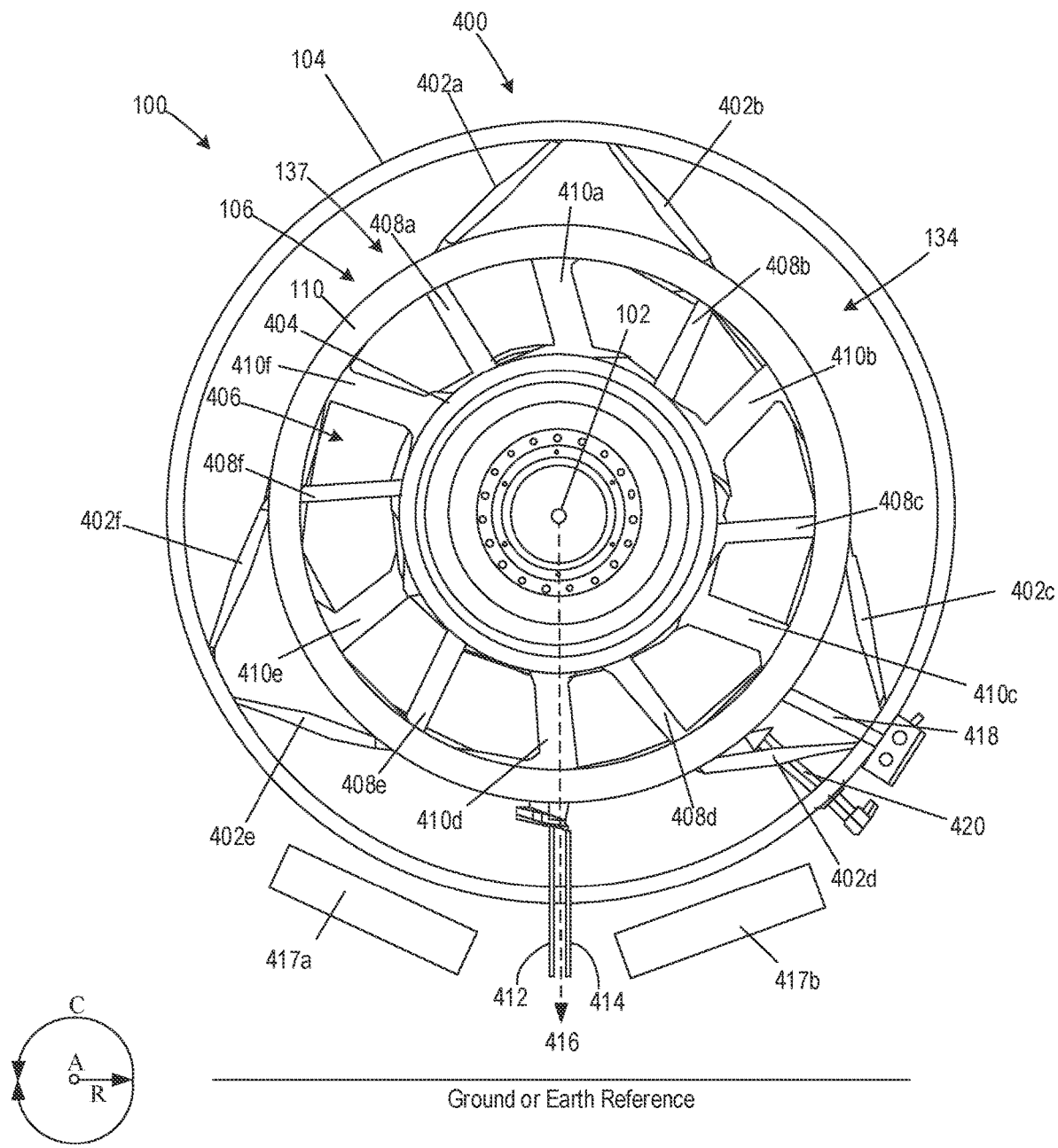
FIG. 4 is an axial view of the turbofan engine of FIG. 1 taken along line A-A, illustrating a first exemplary embodiment of a turbine rear frame link assembly having six links that can be implemented on the turbofan engine.

FIG. 4 is an axial view of the turbofan engine 100 taken along line A-A of FIG. 1 showing a first example of a turbine rear frame link assembly 400 ("link assembly 400") constructed in accordance with the teachings of this disclosure. The link assembly 400 can be implemented as the turbine rear frame link assembly 138 in FIG. 1, for example. The axial A, radial R, and circumferential C direction diagram is shown in FIG. 4 for reference.

The link assembly 400 includes a set of links 402a-402f that are coupled between the outer bypass duct 104 and the turbine rear frame 137 of the gas turbine engine 106. The turbine rear frame 137 includes the outer casing 110 of the gas turbine engine 106 and components radially inward thereof. In this example, the set of links 402a-402f includes six links 402a-402f. The links 402a-402f are arranged around the gas turbine engine 106 on a plane that is perpendicular to the centerline axis 102 (shown as a point in FIG. 4) of the turbofan engine 100. The links 402a-402f are coupled between the outer bypass duct 104 and the outer casing 110. In particular, one end of each of the links 402a-402f is coupled to the outer bypass duct 104 and the opposite end of each of the links 402a-402f is coupled to the outer casing 110. The links 402a-402f extend through the bypass airflow passage 134. The links 402a-402f support the turbine rear frame 137 (and, thus, the gas turbine engine 106) relative to the outer bypass duct 104.

While the link assembly 400 has six links 402a-402f, the link assembly 400 shown in FIG. 4 provides similar dynamic loading and clearance as the known eight and twelve link configurations (FIGS. 2 and 3) and, thus, benefits from the same structural integrity. Advantageously, the six link configuration results in less obstruction in the bypass airflow passage 134 than the eight or twelve link configurations (FIGS. 2 and 3) and, thus, enables better airflow through the bypass airflow passage 134. The six link configuration also results in less weight added to the turbofan engine 100 than the other link assemblies. Further, the six link configuration reduces assembly time and costs associated with manufacture of the turbofan engine 100.

As shown in FIG. 4, the links 402a-402f are generally arranged in pairs (402a/402b, 402c/402d, 402e/402f). Each pair of links (402a/402b, 402c/402d, 402e/402f) is coupled to the outer bypass duct 104 adjacent each other, and then the links of the pair splay away from each other toward the outer casing 110 of the gas turbine engine 106. For example, the first and second links 402a, 402b are coupled to the outer bypass duct 104 adjacent each other, and then splay away from each other toward the outer casing 110. In this example, each pair of links (402a/402b, 402c/402d, 402e/402f) includes two links that are orientated about 90° (e.g., ±10°) relative to each other. Further, each of the pairs of links (402a/402b, 402c/402d, 402e/402f) is about 120° (e.g., ±10°) from an adjacent pair of links relative to the centerline axis 102. Thus, the link connections are distributed evenly around the gas turbine engine 106.

In the example of FIG. 4, each of the links 402a-402f is oriented about 20° (e.g., ±5°) from a tangential direction relative to the outer casing 110 of the gas turbine engine 106. In general, a tangential direction is a direction along a line that touches a curve at a point and is perpendicular to a radial line extending from the center of the curve to the point. This orientation minimizes punch loading at the ends of the links 402a-402f into the outer bypass duct 104 and the outer casing 110. In particular, during operation of the gas turbine engine 106, the hot combustion gases cause the outer casing 110 to thermally expand. This thermal expansion is transferred as loads through the links 402a-402f, where part of the loads are absorbed by the links 402a-402f and part of the loads are distributed circumferentially into the outer bypass duct 104.

As shown in FIG. 4, the turbine rear frame 137 of the gas turbine engine 106 includes the outer casing 110 and an inner casing 404 disposed within the outer casing 110. A passageway 406 is defined between the outer case 110 and the inner casing 404. The combustion gases 156 (FIG. 1) from the LP turbine 122 (FIG. 1) flow through the passageway 406 to the exhaust section 124 (FIG. 1). One or more bearings for the HP shaft 126 and/or the LP shaft 128 can be supported in the inner casing 404. As shown in FIG. 4, the turbine rear frame 137 of the gas turbine engine 106 includes a set of struts 408a-408f coupled between the outer casing 110 and the inner casing 404. The struts 408a-408f extend through the passageway 406. The struts 408a-408f are structural supports. In some examples, the struts 408a-408f are integrally formed (e.g., casted, machined, etc.) with the outer casing 110 and/or the inner casing 404. In other examples, the struts 408a-408f can be constructed as separate parts or components that are coupled to the outer casing 110 and/or the inner casing 404. In the example of FIG. 4, the set of struts 408a-408f includes six struts 408a-408f The struts 408a-408f are spaced equidistant around the inner casing 404. The turbine rear frame 137 also includes fairings 410a-410f extending between the outer casing 110 and the inner casing 404. The fairings 410a-410f are disposed between the struts 408a-408f Although not shown, fairings are also disposed over or around the struts 408a-408f to improve airflow in the passageway 406 around the struts 408a-408f In some examples, the fairings 410a-410f (which are disposed between two of the struts 408a-408f) are empty or hollow. One or more components or lines may extend through one or more of the fairings 410a-410f As such, the fairings 410a-410f can provide protection to such components or lines. For example, FIG. 4 shows a scavenge line 412 and an oil drain line 414. The scavenge line 412 and the drain line 414 connect to the inside of the inner casing 404 and drain oil from the bearings and other components of the turbomachinery. The scavenge line 412 and the oil drain line 414 extend through the fourth fairing 410d, through the outer casing 110, through the bypass airflow passage 134, and through the outer bypass duct 104.

As shown in FIG. 4, the ends of the links 402a-402f are coupled to the outer casing 110 at circumferential locations corresponding to locations of connections between respective ones of the struts 408a-408f and the outer casing 110. In particular, the first link 402a is coupled to the outer casing 110 at the same circumferential location as the first strut 408a, the second link 402b is coupled to the outer casing 110 at the same circumferential location as the second strut 408b, and so forth. This configuration provides the strongest connection or interface for transferring loads between the struts 408a-408f and the links 402a-402f This configuration also reduces or eliminates the need for bridging material as required in known link assemblies like in FIGS. 2 and 3. This reduces weight of the turbofan engine 100. This also reduces manufacturing and assembly time and costs.

As can be seen from FIG. 4, the link assembly 400 is configured such that none of the links 402a-402f extends through the bypass airflow passage 134 at position that intersects a radius 416 extending in a vertically downward direction from the centerline axis 102 (shown as a point in FIG. 4). As used herein, the term "vertically downward direction" is defined to mean a direction that is perpendicular to a horizontal axis that is parallel to a ground or Earth reference and that points toward the ground or Earth reference. Therefore, when the turbofan engine 100 is orientated such that the centerline axis 102 is horizontal relative to the ground or Earth reference, the radius 416 extends perpendicular from the centerline axis 102 toward the ground or Earth reference. By freeing this position of the bypass airflow passage 134 from links, the scavenge line 412 and the oil drain line 414 can extend through the bypass airflow passage 134 in the vertically downward direction. This position is the most favorable position for these lines to drain oil and other fluids, because it is the optimal position for allowing gravity to pull the oil and other fluids downward through the lines. This also reduces or eliminates the need for pumps or other devices to move oil through for draining oil because gravity helps pull the oil through the lines. This position also allows the scavenge line 412 and the oil drain line 414 to miss full authority digital engine control (FADEC) boxes 417a and 417b that are typically disposed outside of the outer bypass duct 104 as shown in FIG. 4.

The turbofan engine 100 also includes a pyrometer 418 and a turbine button probe 420, as shown in FIG. 4. The pyrometer 418 measures the temperature of the turbine rear frame 137 at the outer casing 110. The turbine button probe 420 measures the temperature of the airstream through the passageway 406. The pyrometer 418 and the turbine button probe 420 extend through the outer bypass duct 104, through the bypass airflow passage 134, and into the outer casing 110 of the turbine rear frame 137. The configuration of the links 402a-402f allows for favorable positioning of the pyrometer 418 and the turbine button probe 420. In particular, there are limited locations where the pyrometer 418 and the turbine button probe 420 can be placed as they are line replaceable units and have space limitations within the engine bay for installation and extraction with the engine installed in the aircraft. The position shown in FIG. 4 is near the bottom, which allows a user to access the pyrometer 418 and the turbine button probe 420 by opening a door or duct on the bottom of the aircraft.

Figure 5:
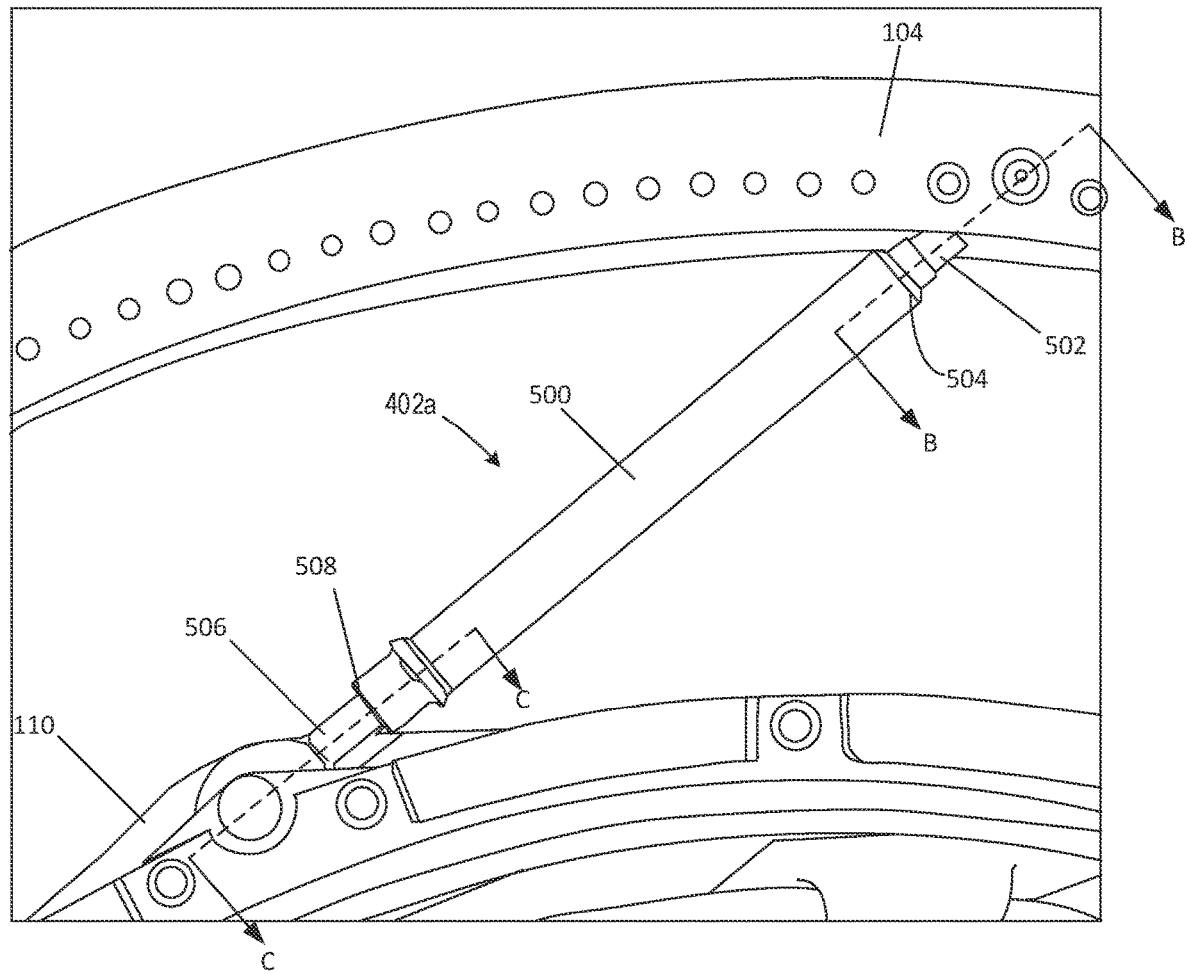
FIG. 5 is an enlarged view of one of the links of FIG. 4.

FIG. 5 is an enlarged view of the first link 402a coupled between the outer bypass duct 104 and the outer casing 110 of the gas turbine engine 106 (FIG. 1). The other links 402b-402f are the same as the first link 402a. Therefore, any of the aspects disclosed herein in connection with the first link 402a can likewise apply to the other links 402b-402f.

As shown in FIG. 5, the first link 402a has a body 500 (e.g., a shaft, a rod, etc.), a first rod end 502 coupled to a first end 504 (e.g., a nut) of the body 500, and a second rod end 506 coupled to a second end 508 (e.g., a nut) of the body 500 opposite the first end 504. The first and second rod ends 502, 506 are threadably coupled to the respective first and second ends 504, 508 of the body 500 (e.g., having internal threads). In some examples, the first rod end 502 and the second rod end 506 are threadably coupled to the body 500 in opposite thread directions. This allows a person to rotate or spin the body 500 to cause the first and second rod ends 502, 506 to extend or retract from the body 500, thereby lengthening or shortening the first link 402a. This can be beneficial when installing the links 402a-402f. The first rod end 502 is pivotably coupled to the outer bypass duct 104 and the second rod end 506 is pivotably coupled to the outer casing 110.

Figure 6:
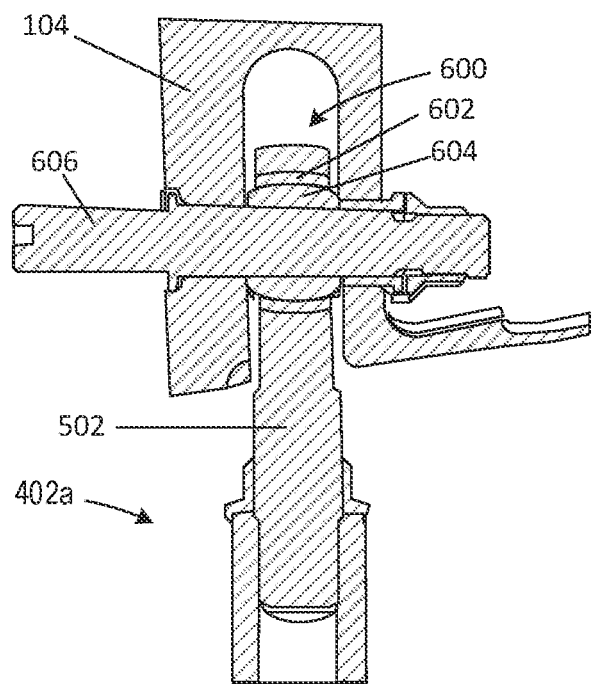
FIG. 6 is a cross-sectional view of one of the ends of the link of FIG. 5 take along line B-B of FIG. 5.

FIG. 6 is a cross-sectional view of the first link 402a and the outer bypass duct 104 taken along line B-B of FIG. 5. A shown in FIG. 6, the first rod end 502 includes a first spherical bearing 600. The first spherical bearing 600 includes a first outer ring 602 and a first inner ring 604. The first outer ring 602 and the first inner ring 604 are pivotable or rotatable about multiple axes relative to each other. A first pin 606 (e.g., a threaded fastener, such as a bolt) is coupled to the outer bypass duct 104. The first pin 606 is substantially perpendicular to the first link 402a. The first pin 606 is coupled to and extends through the first inner ring 604. The first pin 606 holds the first inner ring 604 substantially stationary such that the first outer ring 602 can rotate or pivot about the first inner ring 604. Thus, the first link 402a is coupled to the outer bypass duct 104 via the first spherical bearing 600. The first spherical bearing 600 enables the first rod end 502 (and, thus, the first link 402a) to pivot or rotate relative to the outer bypass duct 104. This reduces stress as the outer casing 110 (FIG. 1) of gas turbine engine 106 expands, contracts, and/or otherwise moves during operation of the turbofan engine 100 (FIG. 1).

Figure 7:
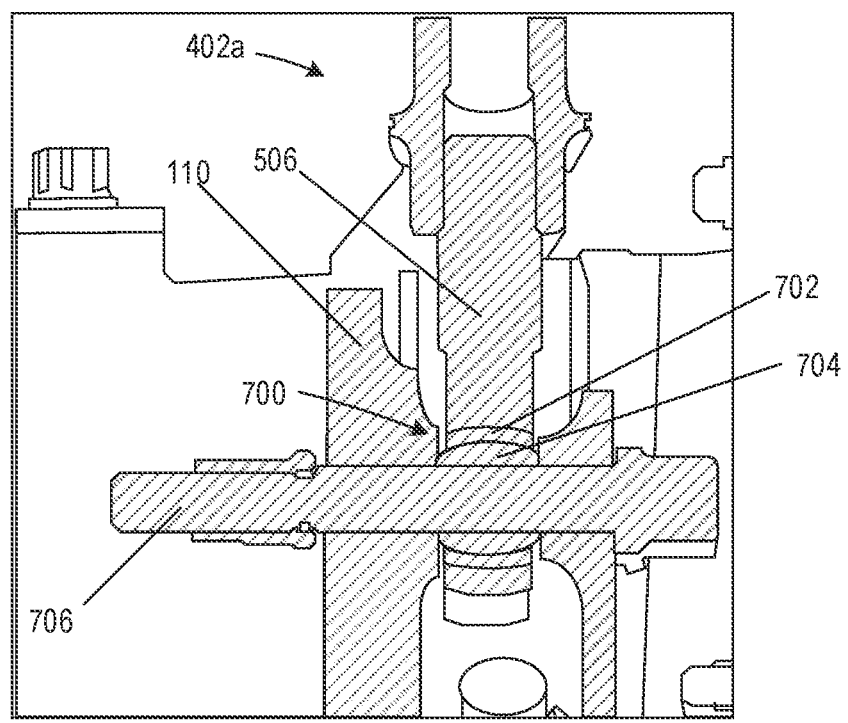
FIG. 7 is a cross-sectional view of the other end of the link of FIG. 5 take along line C-C of FIG. 5.

FIG. 7 is a cross-sectional view of the first link 402a and the outer casing 110 taken along line C-C of FIG. 5. The second rod end 506 is similarly coupled to the outer casing 110 via another spherical bearing. In particular, as shown in FIG. 7, the second rod end 506 includes a second spherical bearing 700. The second spherical bearing 700 includes a second outer ring 702 and a second inner ring 704. The second outer ring 702 and the second inner ring 704 are pivotable or rotatable about multiple axes relative to each other. As shown in FIG. 7, a second pin 706 is coupled to and extends through the second inner ring 704. The second pin 706 is substantially perpendicular to the first link 402a. The second pin 706 holds the second inner ring 704 substantially stationary such that the second outer ring 702 can rotate or pivot about the second inner ring 704. Thus, the first link 402a is coupled to the outer casing 110 via the second spherical bearing 700. The second spherical bearing 700 enables the second rod end 506 (and, thus, the first link 402a) to pivot or rotate relative to the outer casing 110. This reduces stress as the outer casing 110 of the gas turbine engine 106 expands, contracts, and/or otherwise moves during operation of the turbofan engine 100.

Figure 8:
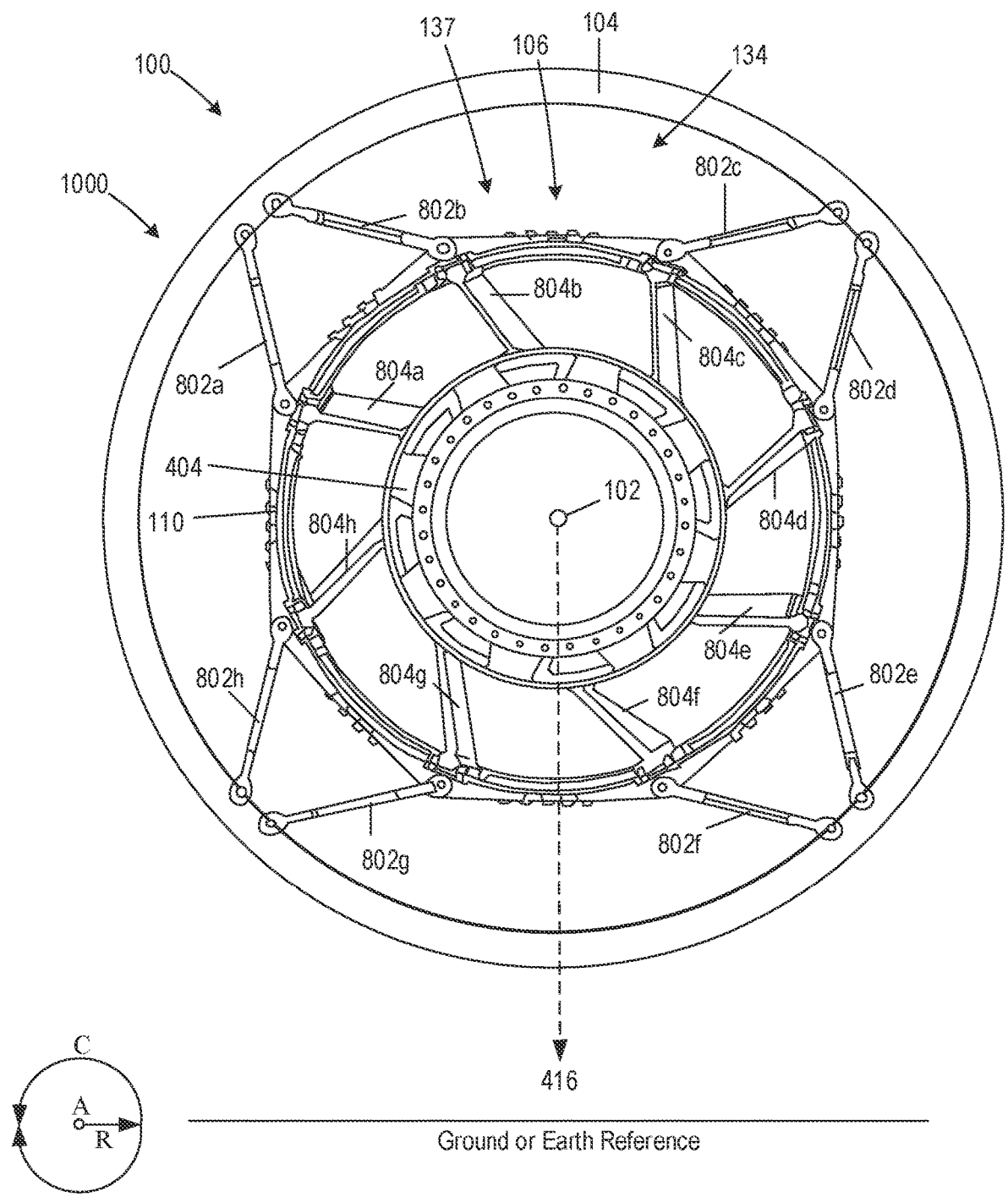
FIG. 8 is an axial view of the turbofan engine of FIG. 1, illustrating a second exemplary embodiment of a turbine rear frame link assembly having eight links that can be implemented on the turbofan engine.

FIG. 8 is an axial view of the turbofan engine 100 taken along line A-A of FIG. 1 showing a second example of a turbine rear frame link assembly 800 ("link assembly 800") constructed in accordance with the teachings of this disclosure. The link assembly 800 can be implemented as the turbine rear frame link assembly 138 in FIG. 1.

In this example, the link assembly 800 includes eight links 802a-802h that are coupled between the outer bypass duct 104 and the turbine rear frame 137 of the gas turbine engine 106. The links 802a-802h are arranged around the gas turbine engine 106 on a plane that is perpendicular to the centerline axis 102 (shown as a point in FIG. 4) of the turbofan engine 100. The links 802a-802f are coupled between the outer bypass duct 104 and the outer casing 110. In particular, one end of each of the links 802a-802h is coupled to the outer bypass duct 104 and the opposite end of each of the links 802a-802h is coupled to the outer casing 110. The links 802a-802h extend through the bypass airflow passage 134. The links 802a-802h support the turbine rear frame 137 (and, thus, the gas turbine engine 106) relative to the outer bypass duct 104. The links 802a-802h are substantially the same as the links 402a-402f disclosed herein. Therefore, any of the aspects disclosed in connection with the links 402a-402f can likewise apply to the links 802a-802h.

As shown in FIG. 8, the links 802a-802h are generally arranged in pairs, where each pair is coupled to the outer bypass duct 104 adjacent each other, and then the links of the pair splay away from each other toward the outer casing 110 of the gas turbine engine 106. Each of the pairs of links (802a/802b, 802c/802d, 802e/802f, 802g/802h) is about 90° (e.g., ±10°) from an adjacent pair of links relative to the centerline axis 102. Thus, the link connections are distributed evenly around the gas turbine engine 106.

In the example of FIG. 8, the turbine rear frame 137 of the gas turbine engine 106 includes eight struts 804a-804h coupled between the outer casing 110 and the inner casing 404. Similar to the example of FIG. 4, the ends of the links 802a-802h shown in FIG. 8 are coupled to the outer casing 110 at circumferential locations corresponding to locations of connections between respective ones of the struts 804a-804h and the outer casing 110. As disclosed above, this configuration provides the strongest connection or interface for transferring loads between the struts 804a-804h and the links 802a-802h. This configuration also reduces or eliminates the need for bridging material as required in known link assemblies like in FIGS. 2 and 3.

Also, as shown in FIG. 8, the link assembly 800 is configured such that none of the links 802a-802h extends through the bypass airflow passage 134 at position that intersects the radius 416 extending in a vertically downward direction from the centerline axis 102 (shown as a point in FIG. 8). As disclosed above, this advantageously allows the scavenge line 412 (FIG. 4) and the oil drain line 414 (FIG. 4) to extend through the bypass airflow passage 134 in the vertically downward direction. This position is the most favorable position for these lines to drain oil and other fluids.

Figure 9:
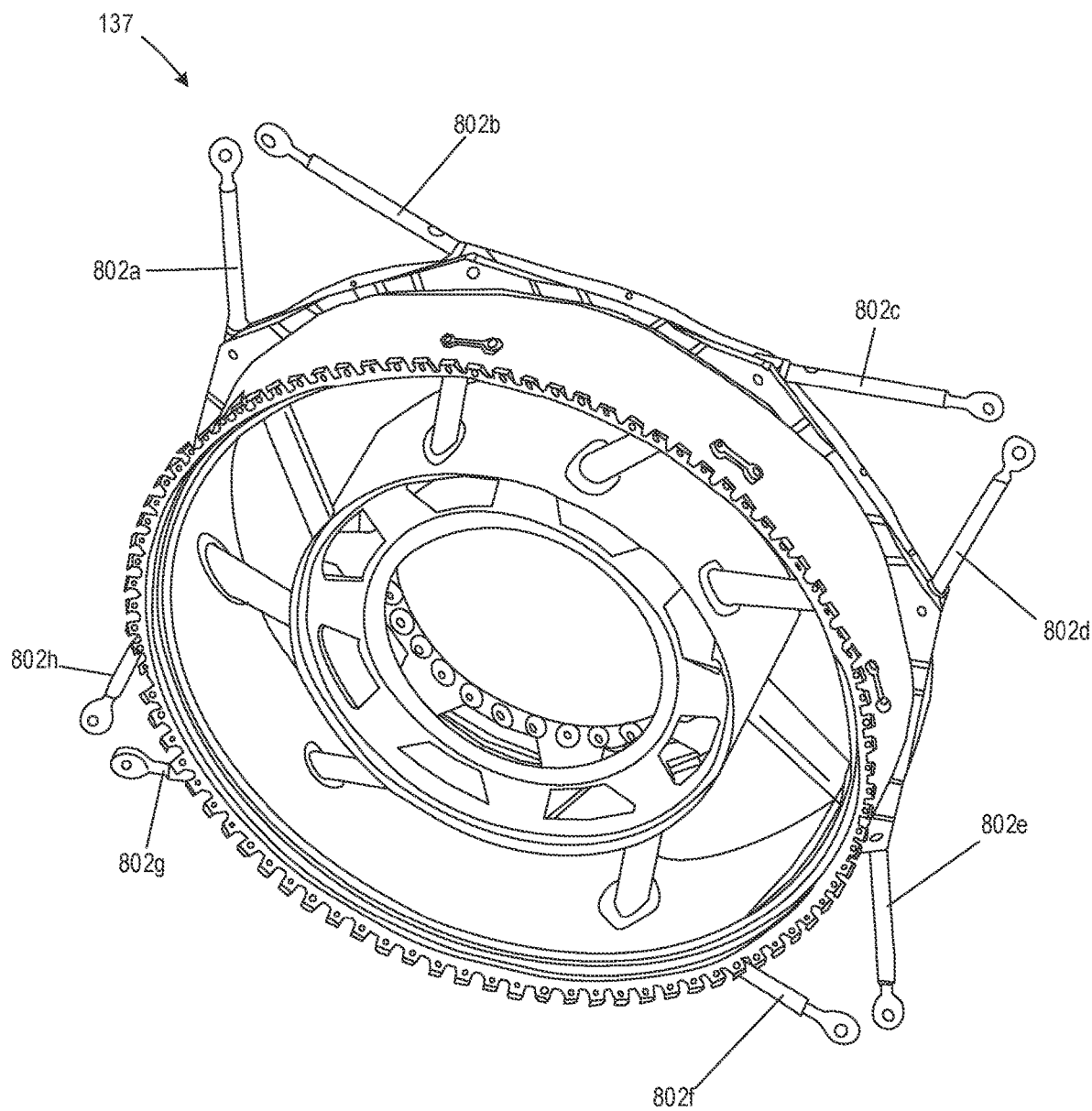
FIG. 9 is a perspective view of a turbine rear frame and the turbine rear frame link assembly of FIG. 8.
Figure 10:
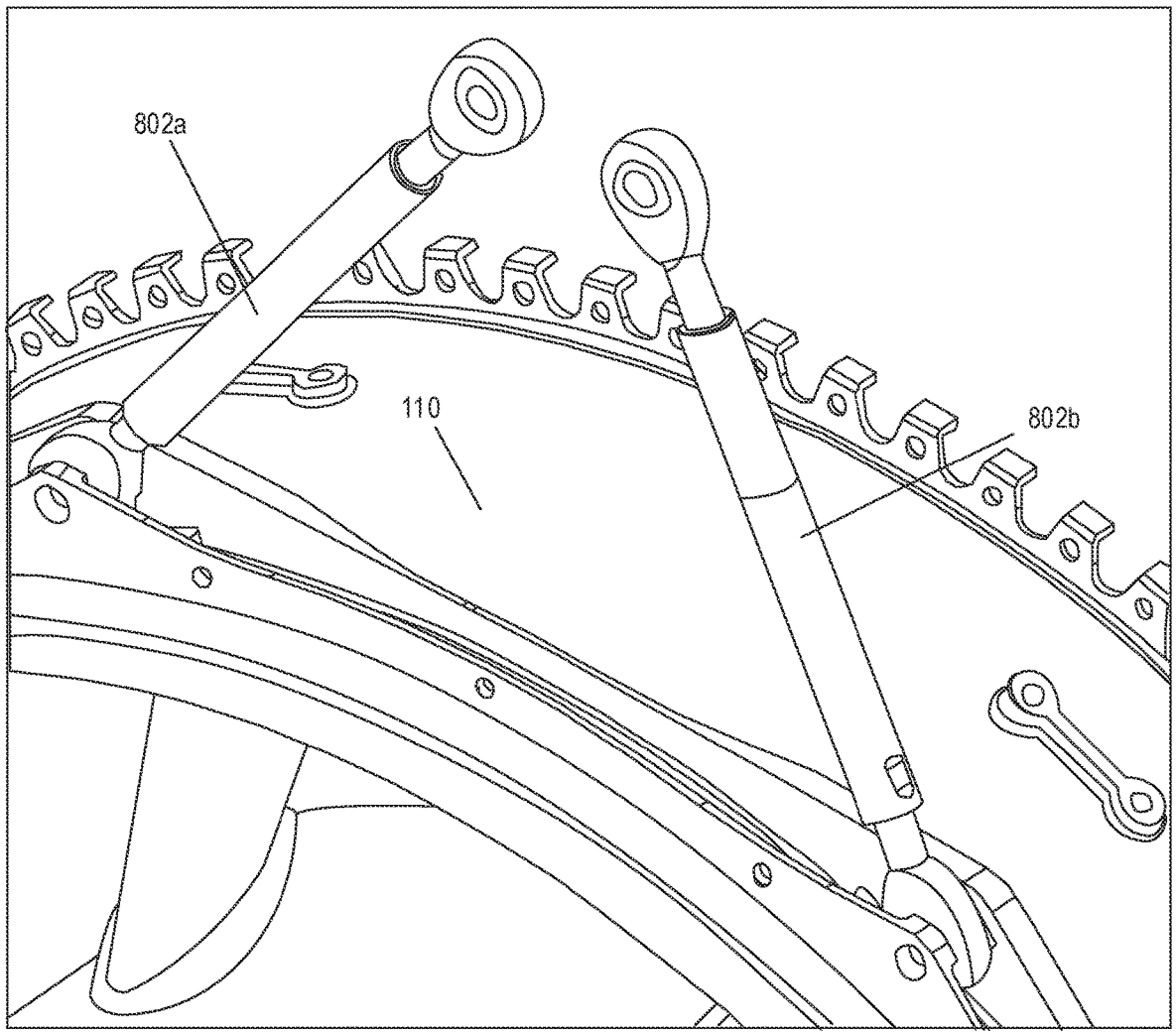
FIG. 10 is an enlarged view of two of the links of the turbine rear frame link assembly of FIG. 8.

FIG. 9 is a perspective view of the turbine rear frame 137 and the links 802a-802h from FIG. 8. FIG. 10 is an enlarged view the first and second links 802a, 802b coupled to the outer casing 110. As shown in FIG. 10, the links 802a-802h are coupled to the outer casing 110 (e.g., via pins 706 (FIG. 7).

Further aspects of the invention are provided by the subject matter of the following clauses.

Example 1 is a turbofan engine including an outer bypass duct and a gas turbine engine having an outer casing. The gas turbine engine is disposed in the outer bypass duct such that a bypass airflow passage is formed between the outer casing of the gas turbine engine and the outer bypass duct. The turbofan engine also includes a turbine rear frame link assembly including a set of links coupled between the outer bypass duct and the outer casing to support the gas turbine engine relative to the outer bypass duct. The links are arranged around the gas turbine engine on a plane that is perpendicular to a centerline axis of the turbofan engine. None of the links extends through the bypass airflow passage at a position that intersects a radius extending in a vertically downward direction from the centerline axis.

Example 2 includes the turbofan engine of any preceding clause, further including a scavenge line and an oil drain line extending through the bypass airflow passage in the vertically downward direction.

Example 3 includes the turbofan engine of any preceding clause, wherein the gas turbine engine includes an inner casing disposed within the outer casing, and a fairing extending between the outer casing and the inner casing. The scavenge line and the oil drain line extend through the fairing.

Example 4 includes the turbofan engine of any preceding clause, wherein the set of links includes only six links.

Example 5 includes the turbofan engine of any preceding clause, wherein the links are arranged in pairs, and wherein each pair of links is about 120° from an adjacent pair of links relative to the centerline axis.

Example 6 includes the turbofan engine of any preceding clause, wherein each pair of links includes two links that are oriented about 90° relative to each other.

Example 7 includes the turbofan engine of any preceding clause, wherein each of the links is oriented about 20° from tangential direction relative to the outer casing.

Example 8 includes the turbofan engine of any preceding clause, further including a pyrometer and a turbine button probe extending through the bypass airflow passage and into the outer casing.

Example 9 includes the turbofan engine of any preceding clause, wherein one of the links includes a body, a first rod end coupled to a first end of the body, and a second rod end coupled to a second end of the body. The first rod end is coupled to the outer bypass duct and the second rod end is coupled to the outer casing of the gas turbine engine.

Example 10 includes the turbofan engine of any preceding clause, wherein the first and second rod ends are threadably coupled to the respective first and second ends of the body.

Example 11 includes the turbofan engine of any preceding clause, wherein the first rod end includes a first spherical bearing and the second rod end includes a second spherical bearing.

Example 12 is a turbofan engine including an outer bypass duct and a gas turbine engine having an outer casing, an inner casing, and a set of struts coupled between the outer casing and the inner casing. The gas turbine engine is disposed in the outer bypass duct such that a bypass channel is formed between the outer casing of the gas turbine engine and the outer bypass duct. The turbofan engine also includes a turbine rear frame link assembly including a set of links coupled between the outer bypass duct and the outer casing to support the gas turbine engine relative to the outer bypass duct. The links coupled to the outer casing at circumferential locations corresponding to locations of connections between respective ones of the struts and the outer casing.

Example 13 includes the turbofan engine of any preceding clause, wherein the set of struts includes six struts, and wherein the six struts are spaced equidistant around the inner casing.

Example 14 includes the turbofan engine of any preceding clause, further including fairings disposed between the struts. The fairings are hollow.

Example 15 includes the turbofan engine of any preceding clause, wherein each of the links is coupled to the outer casing and the outer bypass duct via spherical bearings.

Example 16 includes the turbofan engine of any preceding clause, wherein the set of links includes eight links, wherein the links are arranged in pairs, and wherein each pair of links is about 90° from an adjacent pair of links relative to a centerline axis of the turbofan engine.

Example 17 includes the turbofan engine of any preceding clause, wherein the set of links includes only six links.

Example 18 includes the turbofan engine of any preceding clause, wherein the links are arranged in pairs, and wherein each pair of links is about 120° from an adjacent pair of links relative to a centerline axis of the turbofan engine.

Example 19 includes the turbofan engine of any preceding clause, wherein each pair of links includes two links that are oriented about 90° relative to each other.

Example 20 is a turbofan engine including an outer bypass duct and a gas turbine engine having an outer casing. The gas turbine engine is disposed in the outer bypass duct such that a bypass airflow passage is formed between the outer casing of the gas turbine engine and the outer bypass duct. The turbofan engine also includes a turbine rear frame link assembly including six links coupled between the outer bypass duct and the outer casing to support the gas turbine engine relative to the outer bypass duct. The links are arranged around the gas turbine engine on a plane that is perpendicular to a centerline axis of the turbofan engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbofan engine comprising:
   an outer bypass duct;
   a gas turbine engine having an outer casing, the gas turbine engine disposed in the outer bypass duct such that a bypass airflow passage is formed between the outer casing of the gas turbine engine and the outer bypass duct;
   a turbine rear frame link assembly including links coupled between the outer bypass duct and the outer casing to support the gas turbine engine relative to the outer bypass duct, the links arranged around the gas turbine engine on a plane that is perpendicular to a centerline axis of the turbofan engine, wherein none of the links extends through the bypass airflow passage at a position that intersects a radius extending in a vertically downward direction from the centerline axis; and
   a pyrometer and a turbine button probe extending through the bypass airflow passage and into the outer casing.

2. The turbofan engine of claim 1, further including a scavenge line and an oil drain line extending through the bypass airflow passage in the vertically downward direction.

3. The turbofan engine of claim 1, wherein the links include only six links.

4. The turbofan engine of claim 3, wherein the links are arranged in pairs, and wherein each pair of the links is about 120° from each adjacent pair of the links relative to the centerline axis.

5. The turbofan engine of claim 4, wherein each pair of the links includes two links that are mutually oriented about 90° relative to each other.

6. The turbofan engine of claim 1, wherein one of the links includes a body, a first rod end coupled to a first end of the body, and a second rod end coupled to a second end of the body, the first rod end coupled to the outer bypass duct, the second rod end coupled to the outer casing of the gas turbine engine.

7. The turbofan engine of claim 6, wherein the first rod end and the second rod end are threadably coupled to the first end of the body and the second end of the body respectively.

8. The turbofan engine of claim 6, wherein the first rod end includes a first spherical bearing and the second rod end includes a second spherical bearing.

9. The turbofan engine of claim 1, wherein each of the links is coupled to the outer bypass duct via a first pin and coupled to the outer casing via a second pin.

10. A turbofan engine comprising:
an outer bypass duct;
a gas turbine engine including an inner casing disposed within an outer casing, the gas turbine engine disposed in the outer bypass duct such that a bypass airflow passage is formed between the outer casing of the gas turbine engine and the outer bypass duct;
a scavenge line and an oil drain line extending through the bypass airflow passage in a vertically downward direction;
a fairing extending between the outer casing and the inner casing, the scavenge line and the oil drain line extending through the fairing; and
a turbine rear frame link assembly including links coupled between the outer bypass duct and the outer casing to support the gas turbine engine relative to the outer bypass duct, the links arranged around the gas turbine engine on a plane that is perpendicular to a centerline axis of the turbofan engine, wherein none of the links extends through the bypass airflow passage at a position that intersects a radius extending in the vertically downward direction from the centerline axis.

11. A turbofan engine comprising:
an outer bypass duct;
a gas turbine engine having an outer casing, the gas turbine engine disposed in the outer bypass duct such that a bypass airflow passage is formed between the outer casing of the gas turbine engine and the outer bypass duct; and
a turbine rear frame link assembly including links coupled between the outer bypass duct and the outer casing to support the gas turbine engine relative to the outer bypass duct, the links arranged around the gas turbine engine on a plane that is perpendicular to a centerline axis of the turbofan engine, wherein none of the links extends through the bypass airflow passage at a position that intersects a radius extending in a vertically downward direction from the centerline axis, and wherein each of the links is oriented about 20° from a tangential direction relative to the outer casing.

12. A turbofan engine comprising:
an outer bypass duct;
a gas turbine engine having an outer casing, an inner casing, and a set of struts coupled between the outer casing and the inner casing, the gas turbine engine disposed in the outer bypass duct such that a bypass channel is formed between the outer casing of the gas turbine engine and the outer bypass duct;
a turbine rear frame link assembly including links coupled between the outer bypass duct and the outer casing to support the gas turbine engine relative to the outer bypass duct, the links coupled to the outer casing at circumferential locations corresponding to locations of connections between respective ones of the set of struts and the outer casing; and
a pyrometer and a turbine button probe extending through the bypass channel and into the outer casing.

13. The turbofan engine of claim 12, wherein the set of struts includes six struts, and wherein the six struts are spaced equidistant around the inner casing.

14. The turbofan engine of claim 12, further including fairings disposed between the struts, the fairings being hollow.

15. The turbofan engine of claim 12, wherein each of the links is coupled to the outer casing and the outer bypass duct via spherical bearings.

16. The turbofan engine of claim 12, wherein the links include only six links.

17. The turbofan engine of claim 16, wherein the links are arranged in pairs, and wherein each pair of the links is about 120° from each adjacent pair of the links relative to a centerline axis of the turbofan engine.

18. The turbofan engine of claim 17, wherein each pair of the links includes two links that are mutually oriented about 90° relative to each other.

19. A turbofan engine comprising:
an outer bypass duct;
a gas turbine engine having an outer casing, the gas turbine engine disposed in the outer bypass duct such that a bypass airflow passage is formed between the outer casing of the gas turbine engine and the outer bypass duct; and
a turbine rear frame link assembly including six links coupled between the outer bypass duct and the outer casing to support the gas turbine engine relative to the outer bypass duct, the six links arranged around the gas turbine engine on a plane that is perpendicular to a centerline axis of the turbofan engine; and
a pyrometer and a turbine button probe extending through the bypass airflow passage and into the outer casing.

\* \* \* \* \*